No. 648,328. Patented Apr. 24, 1900.
J. C. ANDERSON.
MOTOR CAR.
(Application filed Sept. 5, 1899.)
(No Model.) 7 Sheets—Sheet 2.
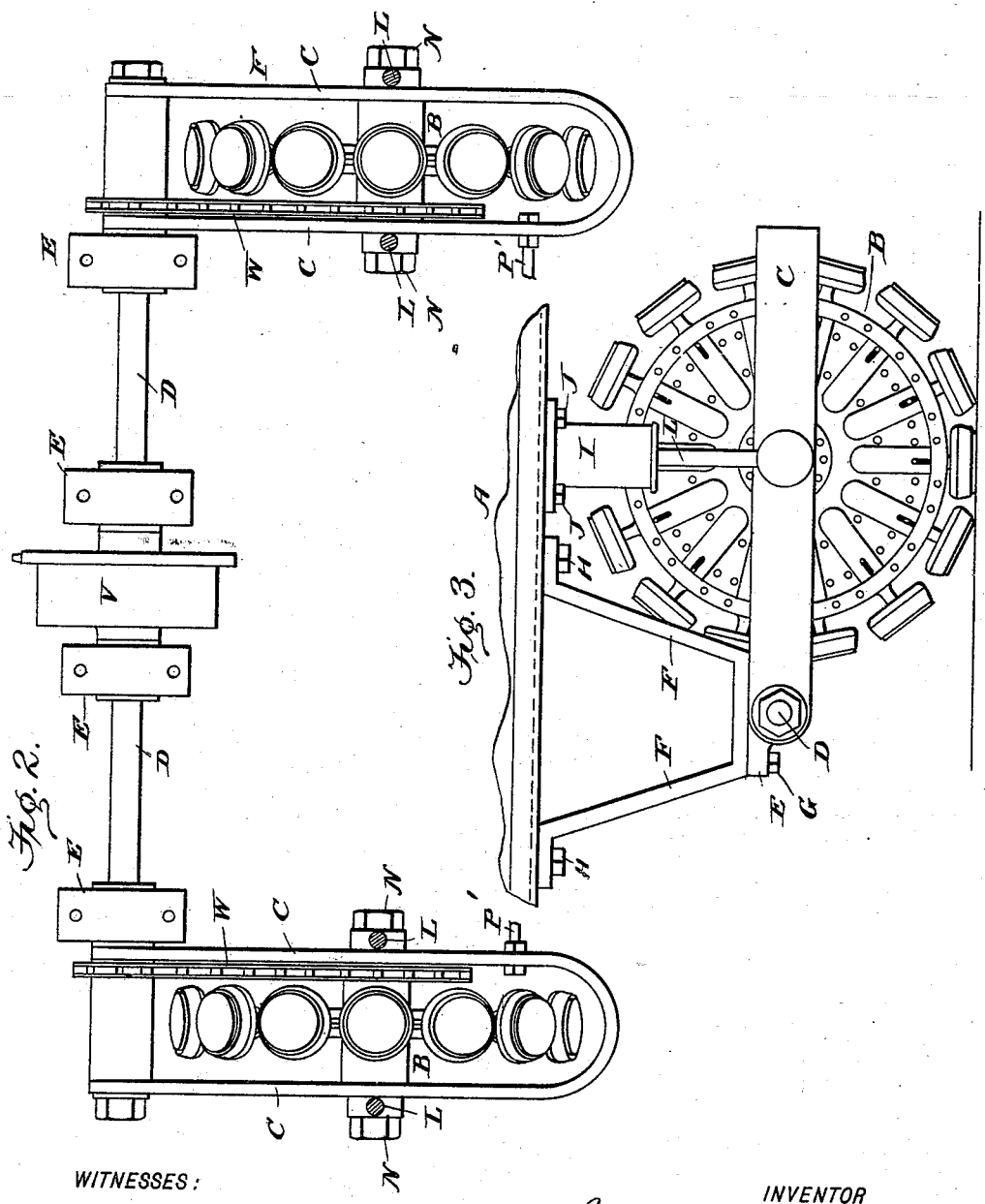

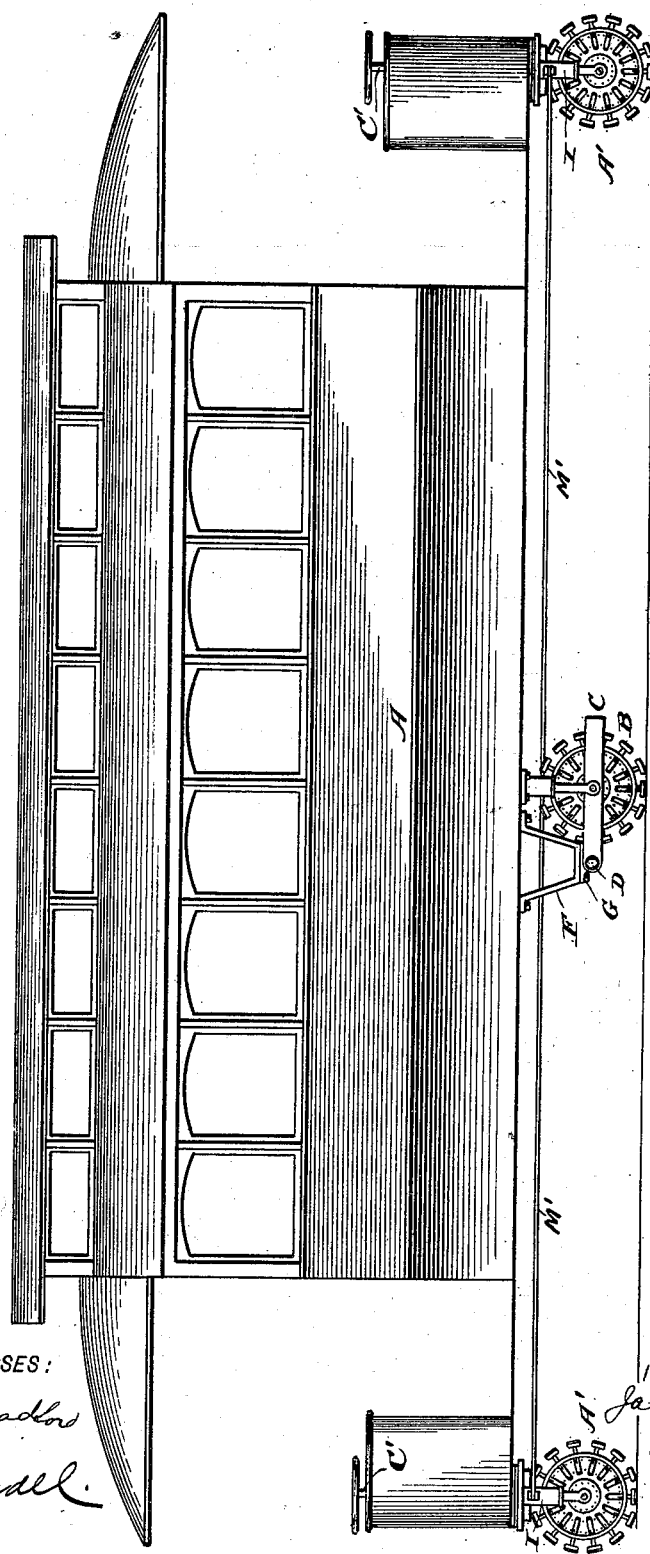

No. 648,328. Patented Apr. 24, 1900.
J. C. ANDERSON.
MOTOR CAR.
(Application filed Sept. 5, 1899.)
(No Model.) 7 Sheets—Sheet 3.
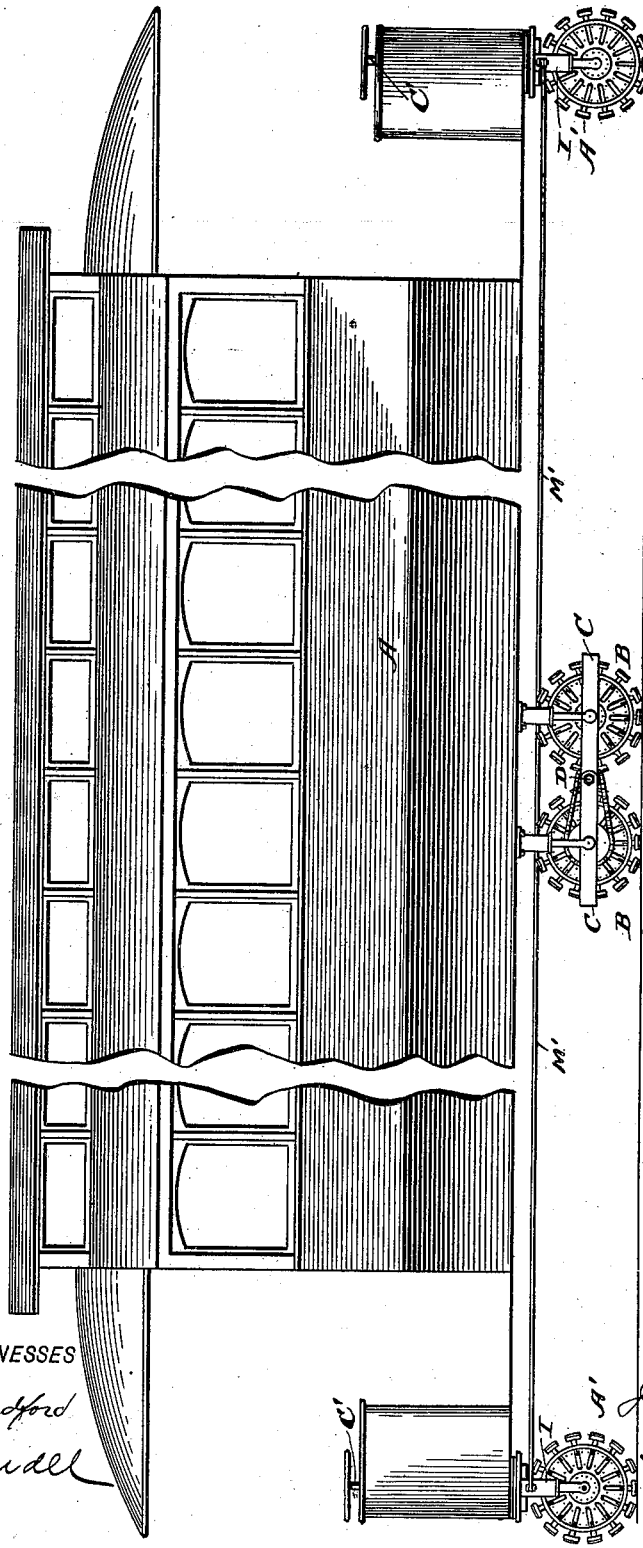

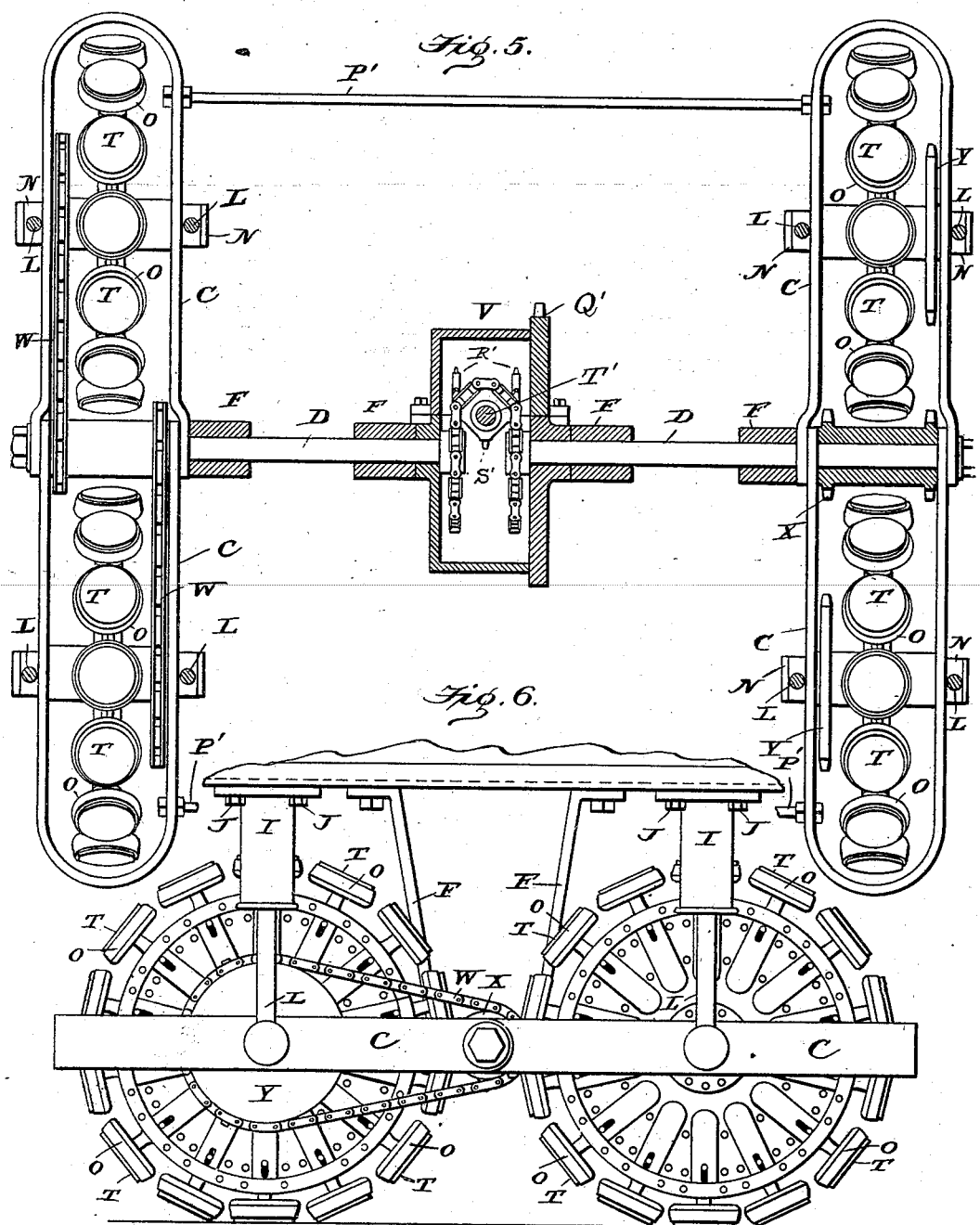

No. 648,328. Patented Apr. 24, 1900.
J. C. ANDERSON.
MOTOR CAR.
(Application filed Sept. 5, 1899.)
(No Model.) 7 Sheets—Sheet 5.
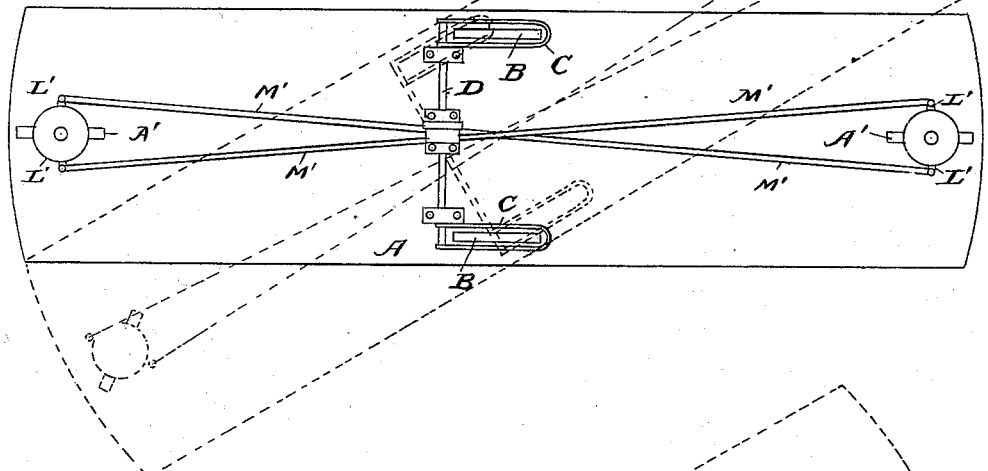
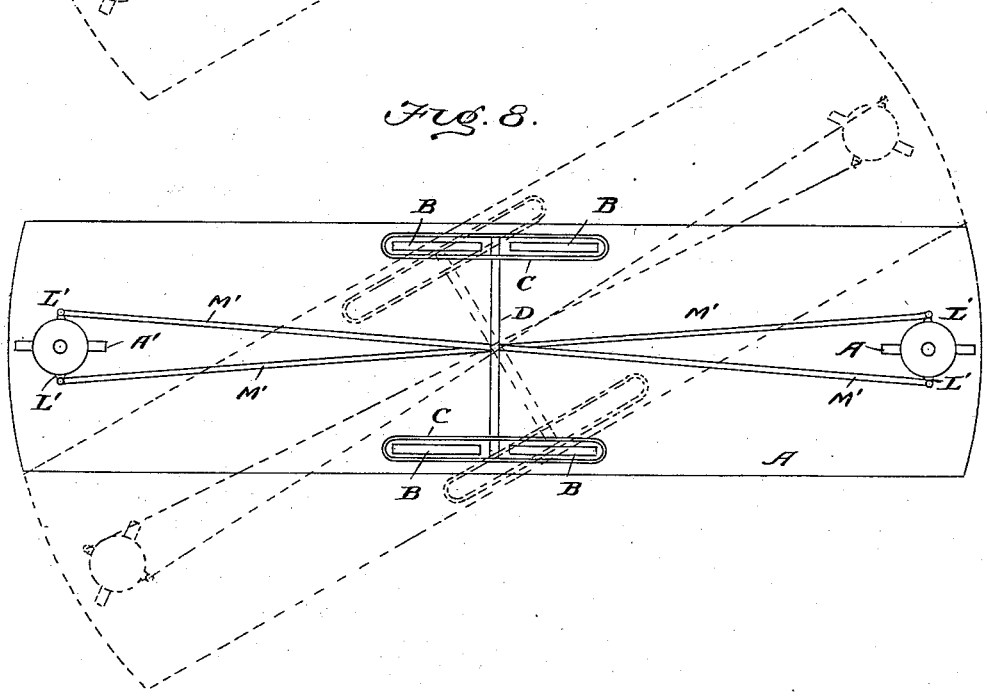
WITNESSES:
Edwin L. Bradford
M. D. Blondell
INVENTOR
Jas. C. Anderson
BY
Wm. C. W. Intire
ATTORNEY No. 648,328. Patented Apr. 24, 1900.
J. C. ANDERSON.
MOTOR CAR.
(Application filed Sept. 5, 1899.)
(No Model.) 7 Sheets—Sheet 6.
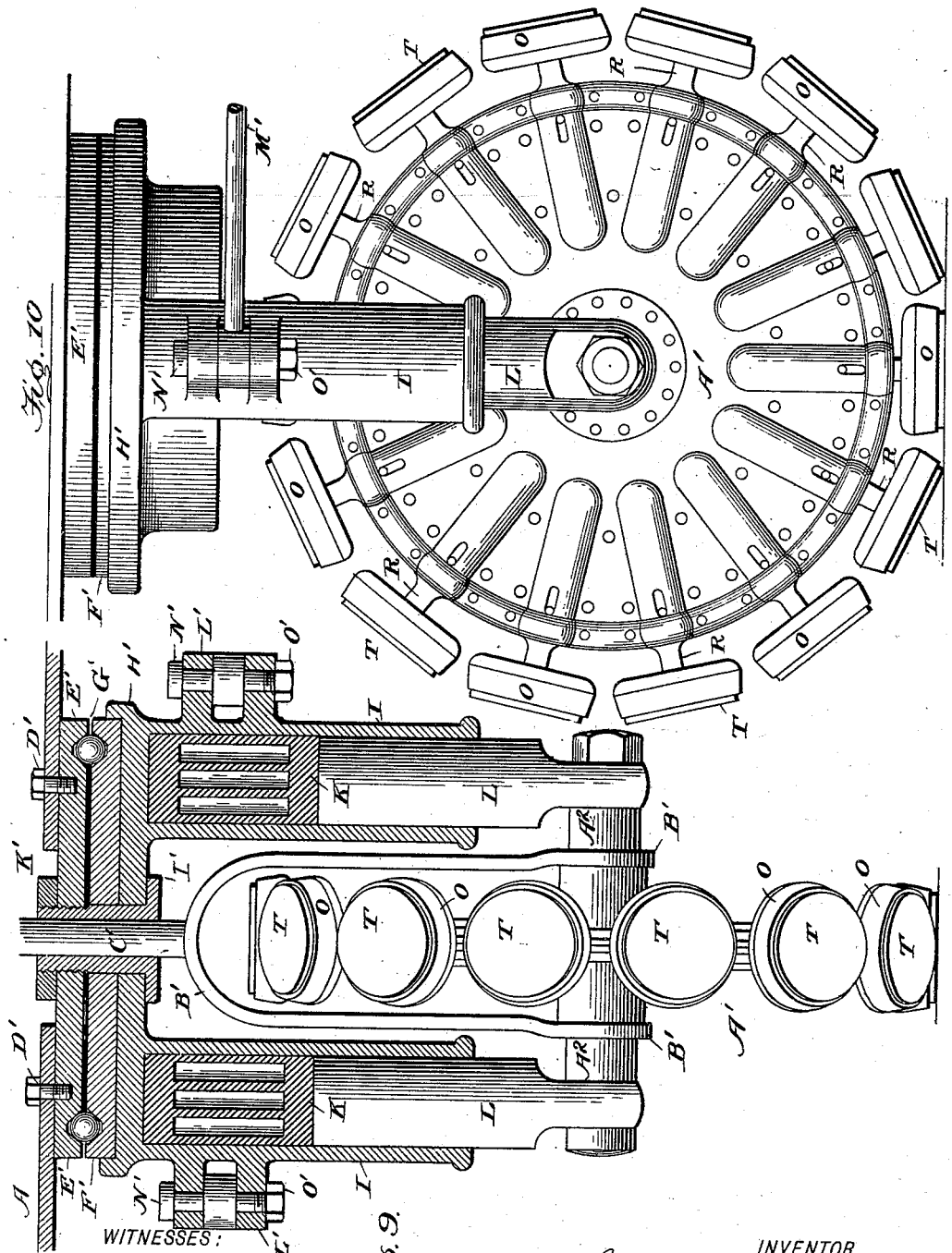
WITNESSES:
INVENTOR
Jas. C. Anderson
BY
ATTORNEY No. 648,328. Patented Apr. 24, 1900.
J. C. ANDERSON.
MOTOR CAR.
(Application filed Sept. 5, 1899.)
(No Model.) 7 Sheets—Sheet 7.
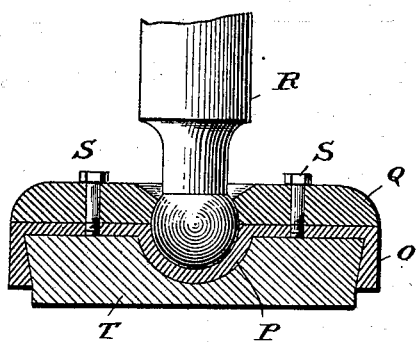
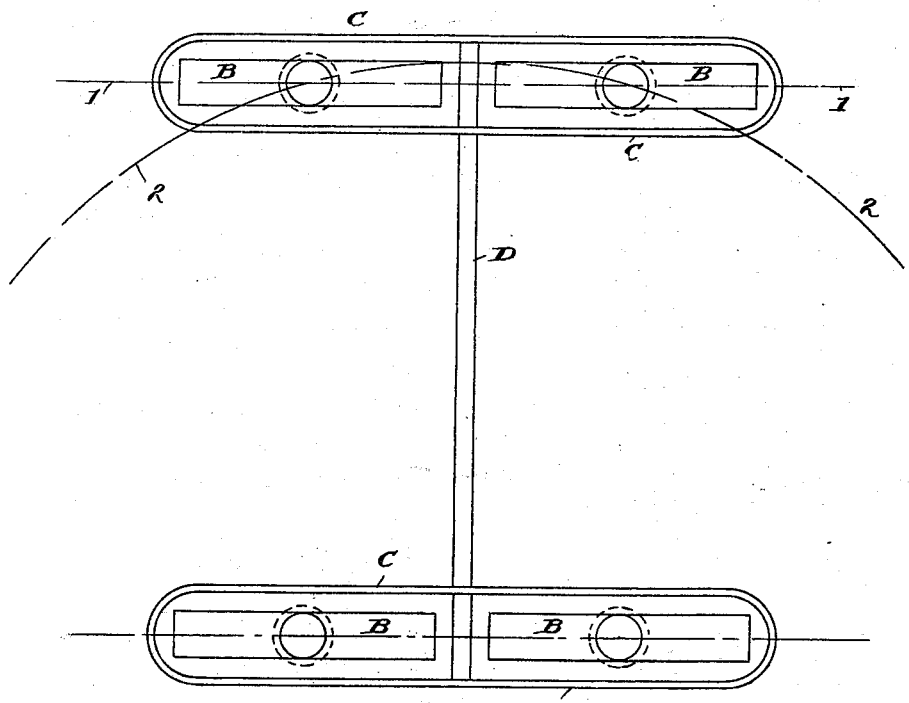

UNITED STATES PATENT OFFICE.

JAMES C. ANDERSON, OF HIGHLAND PARK, ILLINOIS.

MOTOR-CAR.

SPECIFICATION forming part of Letters Patent No. 648,328, dated April 24, 1900.

Application filed September 5, 1899. Serial No. 729,484. (No model.)

*To all whom it may concern:*

Be it known that I, JAMES C. ANDERSON, a citizen of the United States, residing at Highland Park, in the county of Lake and State of Illinois, have invented certain new and useful Improvements in Motor-Cars; and I do hereby declare the following to be a full, clear, and exact description of the invention, such as will enable others skilled in the art to which it appertains to make and use the same.

My invention relates to certain new and useful improvements in street-car construction.

In the art of transportation of bodies and weight the first consideration has been to secure a surface on the roadway which would not present the usual impediments and obstructions due to inequalities existing in any ordinary road, and hence with economy of construction in view it was suggested that two parallel tracks should be laid constituting in themselves two narrow roadways, and it was then proposed to mount the conveyance upon wheels adapted to travel upon such rails. As the longitudinal direction of the rails or roadways was necessarily curved at certain points and as the wheels of a car would not have differential speed, it followed that the wheels traveling on the larger radii were compelled to slip. Hence the rails were made smooth to permit such slipping, this condition being at the expense of desired traction. While this slipping motion has been provided for, the fact remains that all such slipping means friction, and friction of this character means the unnecessary expenditure of the force or power used to propel the car. This fact may be readily understood by carefully considering the sound made by a railway or street car traversing a curve, the flanges and treads of the wheels traveling the curves of larger radii generating a grinding noise perceptible for quite a long distance. These defects have been permissible in vehicles in which the wheels operate as levers and the axles as fulcrums, the motive force being applied to the body of the vehicle or in ordinary railway traffic where the power is applied in a rotary direction—as, for instance, in a locomotive or in cars propelled by electric motive force—because the tracks and tires being both composed of steel whenever the traction due to the weight of the vehicle is overcome by the motive force applied rotatively to the wheels the result is simply the slipping action without any large degree of damage either to the tracks or the wheels, although at the expense of the motive force; but if this same slipping action should take place between a tire and a roadway, either or both susceptible to abrasion, it would follow that the destruction of one or both would soon take place. In this connection, and with reference to the development being made in the art of autotrucks and similar vehicles, it will be found that they are being equipped with tires especially adapted to secure traction to the greatest extent, and in all such vehicles the disastrous result of the slipping action of the wheel would be obvious.

My invention has for its object to provide a car which, while it shall have all of the advantages of such a vehicle for traffic purposes, shall be capable of use upon ordinarily-smooth streets or roadways without rails of any kind and which shall also protect the tires and the roadways from undue wear and abrasion, all of which I accomplish, as I verily believe, for the first time by the special features of construction hereinafter more fully set forth, and with these ends in view consists in the details of construction and arrangement thereof which I will now proceed to describe, referring by letters and numerals to the accompanying drawings, in which—

Figure 1 is a side elevation of a car adapted to travel without rails upon any ordinary street or roadway. Fig. 2 is a detail plan view, on enlarged scale, of the two centrally-arranged driving-wheels and supporting-fork frames and the main power-transmitting shaft and mechanism, with the spring-piston supports shown in section. Fig. 3 is a side elevation of one of said wheels and trucks secured in position. Fig. 4 is a side elevation of a car similar to Fig. 1, but showing double trucks and two wheels on each side of the car. Fig. 5 is a top or plan view, partly in section, similar to Fig. 2, but showing the double trucks illustrated at Fig. 4. Fig. 6 is a side elevation of the double trucks and connections. Fig. 7 is a plan view showing the single centrally-arranged driving-wheels and the end-supporting and steering wheels and steering-rods, the outline of the bottom of the car being also shown and the dotted lines showing the relation of parts when the change of direction is made from a straight line. Fig. 8 is a similar view and illustrating the double trucks and driving-wheels. Fig. 9 is a central vertical section of one of the end-supporting and steering wheels, ball-bearings, steering-rod, and springs, all connected to the under side of the car-body. Fig. 10 is a side elevation of the same. Fig. 11 is a central vertical section of one of the peripheral feet of the driving-wheel and its connection with the ankle of the peripheral leg secured radially with the wheel. Fig. 12 is a diagram representing the bottom part of the peripheries of the double driving-wheels in relation to lines indicating a straight and a curved path of the travel of a car.

Similar letters and numerals of reference indicate like parts in the several figures.

A represents the body of a car of any desired size and shape, being shown at Fig. 1 smaller than at Fig. 4, for reasons hereinafter explained.

The driving-wheels B are journaled on ball-bearings or otherwise within a metal fork or bifurcated arm C, one end of which is pivotally connected to the main or power-transmitting shaft D, supported within boxes E, secured to the lower ends of truck-brackets F by bolts G, and the bracket F is secured in position upon the under side of the car-frame by bolts H or in any other suitable manner. Immediately over the axis of the wheels B spring-cylinders I are secured to the under side of the car-body by bolts J. These cylinders are, so far as their interior construction is concerned, similar to those shown in section at Fig. 9. Their lower ends are open in order that springs K may be located therein (see Fig. 9) of any suitable construction, but preferably of rubber, with longitudinal air-chambers duly inflated, as fully described in an application filed by me on the 31st day of July, 1899, Serial No. 725,665, for improvements in automobile carriages. These cylinders also receive the heads of piston-supports L, which are pivotally mounted upon the axle on which the wheels B are mounted, as will be presently explained. From this construction it will be seen that the wheel trucks or forks C are free to vibrate upon the ends of the shaft D and that the head of the piston-supports L, bearing against the confined springs K within the cylinders L each side of the wheel, gives an easy spring action not only to the wheels, but likewise to the car mounted thereon.

The axle upon which each of the wheels B is mounted pass through the bifurcated trucks or forks C, and projecting each side constitute journals upon which the lower ends of the piston-supports L are pivoted and where they are secured in position by suitable nuts N.

The wheels B may be mounted upon ball-bearings in any suitable manner, and they are preferably of the general construction shown in an application filed by me on the 16th day of August, 1899, Serial No. 727,460, for improvements in wheels for auto-trucks, and which are provided with peripheral feet mounted upon ankles having a radial movement upon the wheel. In the present case, however, instead of pivotally connecting the peripheral feet to the ankles and providing for longitudinal and lateral vibration I connect the feet with the ankles by a ball-and-socket connection, as specially shown at Fig. 11, in which O is the circular hoof or foot proper, formed in its upper surface with a central hemispherical socket P, and Q is a two-part cap with a corresponding socket intersected from above by a socket which will permit of the free movement of the lower extremity of the ankle R. The two-part cap Q is secured in place by screw-bolts S in an obvious manner.

The foot is circular and hollow, as shown, and is filled by a frog or cushion T, composed, preferably, of asphaltum and other compositions or lead or Babbitt metal to secure the proper degree of traction, although other material may be used.

In the application covering the wheel construction just referred to the double articulation of the feet is designed for the purpose of adapting them to the inequalities of the roadway, but in the present case the ball-and-socket connection or joint not only subserves a like purpose, but is especially designed to permit the foot to remain at a state of comparative rest upon the roadway while the wheel changes its direction of travel, thus relieving the cushion, frog, or what may be called "sectional" tire, from the twisting and grinding action which necessarily ensues when a wheel is turned upon a vertical axis.

I desire to emphasize this feature of construction, because it becomes absolutely necessary to the satisfactory steering of my improved car, as will appear hereinafter.

In the construction shown at Figs. 1, 2, and 3 one wheel B is arranged on each side under the center of the car, pivoted to the main power-driven shaft D, which is made in two sections, with the adjacent or inner ends supported in journal-boxes U and the two outer ends in the boxes E, all of which are bolted to brackets F. The inner ends of the two-part shaft D are connected by any suitable differential mechanism V; but I prefer the construction and arrangement shown and described in the application filed by me for improvements in automobiles and hereinbefore referred to. From the construction described it will be seen that each of the two driving-wheels B have independent vibratory movement with their fork-frames C upon the main power-driven shaft D, that each are driven independently and differentially, (when necessary, as in turning corners,) and that the axle of each wheel is supported at each end against a spring through the medium of the piston-supports L and springs K in the cylinders I, which conditions necessarily give to the car a very easy spring action and also enables each and every one of the wheels to accommodate itself to all of the inequalities in the surface of the road without necessarily disturbing the horizontal equilibrium of the car. It will be seen that each wheel and what may be termed its "truck" is connected with the underside of the car at four points—viz., at the two ends of the two legs of the bracket F and at the points of connection with the two spring-cylinders I—and that there are two parallel vertical planes of vibration—to wit, one through the axis of the main driven shaft D and the other through the axis of the wheel B—and that these conditions exist at both sides of the car independently of each other and that the vertical movement may be likened to that of a bar rocking upon a variable or constantly-changing fulcrum.

Before proceeding to describe the end wheel-supports of the car and their construction I will now describe a modification of the central driving-wheel construction and one which is adapted for use in connection with cars having greater length and capacity than those equipped with two wheels, as already described, and in doing so especial reference is made to Figs. 4, 5, 6, and 8. In this construction I provide two driving-wheels B, each mounted in forks C and each provided with piston-supports L, spring-cylinders I, and springs K, substantially such as I have described with reference to the single-wheel construction; but in the present construction both of the forks C are pivoted on the end of the shaft D, which becomes a common center of vibration of both forks. The trucks on each side of the car in this case it will be seen are connected with the bottom of the car at six points—viz., at the ends of the two legs of the bracket F and the four spring-cylinders I. The bracket-support F is intermediate and central of the spring-cylinder supports I and the distance between the spring-cylinders is in exact proportion to the length of the forks C, and this is equally true in the single-wheel construction.

With the four-wheel construction just described it will be seen that the car supported thereon may have vertical movement in five parallel planes on each side of its longitudinal center—namely, the vertical planes through the four spring-cylinders and the vertical planes passing through the pivot or hinge connecting the two-wheel fork-frames C C, or ten planes on both sides. The double trucks and wheels are employed when the car is of excessive length and capacity and for the purpose of securing a longer central support and also for the purpose of providing the additional traction which would be necessary.

Where the single wheels and trucks are used, the wheels are driven through the medium of a drive-chain W, traversing sprocket-wheels X on the shaft D and sprocket-wheels Y on the hubs of the wheels B, and where the double construction is used two chains W are employed, as best shown at Fig. 5, and hence the power and motion may be applied to the two wheels, one each side of the car, while each of said wheels, with its fork C, is free to vibrate upon the end of the shaft D.

The ends of the car are supported each upon a centrally-arranged steering-wheel A', which is in all respects like the driving-wheels B. In describing the arrangement and operation of the end steering-wheels A' reference is made to Figs. 1, 4, 7, 8, 9, and 10, and especially to Figs. 9 and 10, which are on enlarged scale. The wheels A' are mounted in suitable ball-bearings on the axle $A^2$ in the ends of a fork-frame B', which latter is formed integral with a steering-post C'. To the under side of the car is secured by screw-bolts D' a circular metal plate E', with a circular ball-race in its lower face. F' is a similar plate with a corresponding ball-race in its upper face. Both of these plates are made of tool-steel and accurately adjusted to confine antifriction-balls G'. The plate F' is adapted to be seated in the circular top H' of twin spring-cylinders I, the latter sufficiently far apart to constitute a space for the fork-frame B' of the wheel A', as clearly shown at Fig. 9, and each cylinder is provided with a spring K, as heretofore explained. The circular head of the twin cylinders I and the circular plates E' and F' are all bored centrally to receive the shank of a hollow or spool king pin or bolt I', the upper end of which is threaded to receive a securing-nut K', and in this way the twin cylinders, plates E' F', and antifriction-balls G' are all assembled and secured in proper relation with the car. The steering-post C' passes rotatively through the king-bolt I' and nut K' and is provided at its upper end with any suitable lever or handwheel for rotating the same. The axle $A^2$ of the wheel A' extends laterally a sufficient distance to receive and have secured thereto two piston-supports L, which enter the spring-cylinders I, as heretofore explained, and when the parts are all assembled, as shown in Fig. 9, it will be seen that the rotation of the steering-post C' will, through the medium of the fork B', axle $A^2$, piston-supports L, and cylinders I, cause the wheel A' to rotate on its tangential pivot and the cylinder-head to rotate upon its ball-bearing.

The cylinder-heads are provided with diametric lugs L', adapted to receive the ends of pitman rods or chains M', which cross and are secured in place in the lugs L' by bolts N' and nuts O', and as a result of this arrangement when the wheel A' at either end of the car is turned upon its tangential pivot and the cylinder-head is correspondingly rotated the wheel at the opposite end will be turned by the synchromatic rotation of the cylinder-head at that end of the car, and consequently the two wheels A' will occupy the relation shown in dotted lines at Figs. 7 and 8, the forward wheel leading that end of the car away from a straight line in one direction and the rear wheel leading the rear end of the car away from a straight line in the opposite direction, the center driving-wheels of the car becoming substantially the axis upon which the car-body as a whole turns.

At this point it is most proper to recur to the construction and operation of the peripheral hoofs or feet O of the several wheels, and attention is particularly directed to the diagram shown at Fig. 12 and in which 1 represents a straight path in which a car is presumably traveling, and 2 a curve or turn made by the car in changing its direction. The small circles in solid lines are intended to represent the peripheral feet of the wheels in contact with the roadway at the point of divergence between the straight and curved paths 1 and 2.

Now, recurring to the steering of the car, when the wheels A' at each end of the car are swiveled to change the direction of the car the foot in contact with the roadway at that moment and represented by the small circles in solid lines at Fig. 12 remains in tractional contact with the roadway, while the ankle R, supporting said foot, rotates on its ball-and-socket joint, as indicated by the circles in broken or dotted lines in Fig 12, and hence, while the car and wheels change their direction, the frog cushion or section T of the tire remains stationary with reference to the axial movement of the ankle, and thus the frog or cushion is protected against the twisting or grinding action so destructive in wheels and tires of ordinary construction.

The arrangement of the wheels is such that only a single wheel is employed at each end of the car, while at the same time the car-body is thoroughly supported and the steering rendered exceedingly easy and simple, and by reason of this character of support, the construction of the wheels, and the vibratory action of the wheel-trucks, coupled with the peculiar arrangement of the springs, it will be apparent that great comfort and ease are secured for the passengers, because any vertical movement of the car-body as a whole is analogous to the movement of a body placed on an ordinary spring-bottom chair or upon an air-cushion, in which case the spring while yielding maintains the weight in a horizontal plane free from any lateral swaying motion. In other words, the car remains in horizontal equilibrium, while the wheel construction and auxiliary springs permit the wheels to adapt themselves to the inequalities and also serve to take up and dissipate the momentum shocks which would otherwise be felt by the passengers.

In connection with the arrangement of the single steering-wheels at each end of the car and connected as described I am enabled to take a comparatively-long car around a short curve, because while the front wheel causes the car to swivel or turn on its central wheels, as heretofore described, and leads the front end around the arc or curve of which the center of the car is the axis, the rear steering-wheel performs a similar function toward the rear end of the car and counteracts the tendency of the rear end to travel toward and to intersect the arc described by the front end, which would be the case if the rear end were not carried away from the path it would naturally travel. In other words, with a long car turning around the corner or intersection of two narrow streets, if the car should be steered at its front end only, while such end would turn said corner the rear end would pass in substantially a straight line across the corner. In my construction the rear wheel leads the rear end of the car away from such direction and toward the plane of the new or desired path of travel.

Referring to the forks C, in which the driving-wheels are supported, a rod or brace P' connects the full ends, as most clearly shown at Fig. 5, and operates to hold the forks on each side of the car in parallelism.

While I have shown the head of the twin spring-cylinders provided with ball-bearings and prefer such construction, it will be understood that I do not wish to be confined to such construction, as said head may be rotatively connected with the car in any other suitable manner, and many other variations may likewise be made in the details of construction without departing from the spirit of my invention. For instance, while I have shown and prefer the steering-wheels located near the front extremity of the platforms they may be located in rear of such point and at any locality so long as they constitute supports for the ends of the car to properly coöperate with the supports which the driving-wheels give at the center.

Among other advantages of my improved car it will be seen that the wheels being of the construction shown and described may be readily repaired, as the parts are all interchangeable, and that by reason of the peculiar construction and operation of the peripheral feet there is a less percentage of wearing-surface brought in contact with the roadway and that such surfaces as are brought in contact with the roadway are not subjected to so great a wearing action as is the case with a wheel of ordinary construction. Likewise in lieu of connecting the peripheral feet with the ankles by the ball-and-socket joint shown other means may be employed to secure universal, and particularly rotative, motion. For instance, the universal joint may be located in the ankle rather than between the ankle and the foot.

While I have not shown or described any particular kind of motive power, it will be understood that any preferred form may be employed and connected by a sprocket-chain with the power-transmitter V, and in the use of such a connection between the motor and the transmitter I prefer the sprocket-and-chain gearing constituting the subject-matter of an application filed by me on the 31st day of July, 1899, Serial No. 725,664, which illustrates and describes a sprocket-chain traversing sprocket-wheels with only three sprockets equidistant from each other, and I also contemplate using the same means for transmitting motion from the shaft D to the several driving-wheels. This mode of transmitting power and motion is especially desirable and necessary in my improved car, as by its use I am enabled to avoid the disagreeable noise which results from ordinary gear-wheels or sprocket-wheels having a multiplicity of sprockets engaging with the links of the chain.

I have so far referred to the power-transmitting mechanism between the adjacent ends of the shafts D by the reference-letter V and making reference to a pending application. In the said application will be found a full description of the construction and operation of the mechanism, which consists of a two-part case or box V, provided with a sprocket-gear Q', (see Fig. 5,) rotatively mounted upon the ends of the shafts D and secured against lateral movement by sprocket-wheels R', fastened on the inner ends of said shaft, two other sprocket-wheels S', arranged on a shaft T' at right angles to the shaft D and constituting a chord of the cylindrical box V, and a continuous chain with links at right angles to one another and adapted to traverse the several sprocket-wheels R' and S'.

What I claim as new, and desire to secure by Letters Patent, is—

1. A motor-car adapted for use upon streets and ordinary roadways and consisting of a body mounted centrally upon driving-wheels disposed on each side of the longitudinal center of the body in trucks or frames rigidly and vibratively secured to said body, and end supporting and steering wheels pivotally connected with the body in its longitudinal center, substantially as and for the purposes set forth.

2. A car having self-contained motive force, mounted centrally upon driving-wheels disposed each side of the longitudinal center of the car and connected by suitable means with the self-contained motive force, and end supporting and steering wheels pivotally connected with the body in its longitudinal center and provided with suitable steering mechanism, substantially as and for the purpose set forth.

3. A car having self-contained motive force and mounted upon centrally-arranged driving-wheels and end supporting and steering wheels, pivotally connected in the longitudinal center of the body, the driving and steering wheels having sectional traction peripheries, said sections adapted to rotate independently upon radial axes, whereby the changes in direction of travel may be made without undue wear of the wheels, substantially as hereinbefore set forth.

4. A car having self-contained motive force and mounted upon central driving-wheels, and end supporting and steering wheels, the driving-wheel trucks being pivotally connected at one end to the body of the car, and supported at the opposite or vibratory end against springs arranged on the under side of the body of the car, in combination with means as described for driving each wheel independently of the others as and for the purposes set forth.

5. A car mounted at each end upon a supporting and steering wheel pivotally secured in the longitudinal center of the car, and sustained midway of its ends upon four wheels, two each side of the longitudinal center, supported in fork-trucks having a common axis of vibration at one end and having spring connections at their outer ends with the body of the car and means substantially as described for driving said wheels independently and differentially, as and for the purposes set forth.

6. The steering-wheels A' mounted in the fork B', having steering-post C', upon an axle A² extended laterally as described and having pivotally connected therewith vertical supports L; the twin spring-cylinders I, formed with head H', and means substantially as described for connecting the same rotatively with the body of the car as and for the purpose set forth.

7. In combination with the steering-wheel A' mounted on axle A², in fork B', and the supports L, twin spring-cylinders I, and head H' adapted to be secured rotatively to the under side of the car, the plate E' secured to the car and the plate F' located in the head H', each provided with circular ball-races, and the antifriction-balls G' confined in the ball-races between the plates E' and F', substantially as and for the purposes set forth.

8. In combination with the car A, steering-wheels A', fork B', steering-post C' and spring-cylinders I, formed with the head H', the hollow ring-ball I' and nut K', substantially as and for the purpose set forth.

9. In combination with the car mounted upon centrally-located driving-wheels and end steering-wheels mounted in supports located within twin spring-cylinders I, formed with heads H', rotatively connected with the car; diametric lugs L' on the cylinders I, and steering-rods M' pivotally connected with the lugs L', substantially as and for the purposes set forth.

10. In combination with the car A, mounted upon central driving-wheels, and end steering-wheels, the latter adapted to be rotated upon the triangular point of contact with the road, means intermediate of and connected with the two steering-wheel supports for causing both wheels to rotate at the same time in opposite directions, whereby the two ends of the car are led in opposite directions upon an arc, of which the center of the car is the axis, substantially as hereinbefore set forth.

In testimony whereof I affix my signature in presence of two witnesses.

JAMES C. ANDERSON.

Witnesses:
C. W. DOWNING,
WM. D. WHEELER.